(12) United States Patent
Rhoden et al.

(10) Patent No.: US 10,785,388 B2
(45) Date of Patent: Sep. 22, 2020

(54) CAMERA SYSTEMS FOR SCOPES

(71) Applicant: TARGETVISION, LLC, Friendswood, TX (US)

(72) Inventors: Richard Charles Rhoden, Friendswood, TX (US); Richard Clayton Rhoden, Pearland, TX (US); James Braden Hoffman, League City, TX (US)

(73) Assignee: TARGETVISION, LLC, Friendswood, TX (US)

( * ) Notice: Subject to any disclaimer, the term of this patent is extended or adjusted under 35 U.S.C. 154(b) by 326 days.

(21) Appl. No.: 15/605,674

(22) Filed: May 25, 2017

(65) Prior Publication Data

US 2017/0346998 A1 Nov. 30, 2017

Related U.S. Application Data

(60) Provisional application No. 62/341,197, filed on May 25, 2016.

(51) Int. Cl.

| H04N 5/225 | (2006.01) |
|---|---|
| H04N 7/18 | (2006.01) |
| F16B 2/12 | (2006.01) |
| G03B 17/56 | (2006.01) |
| G03B 17/48 | (2006.01) |
| F16M 13/02 | (2006.01) |
| H04N 5/232 | (2006.01) |

(52) U.S. Cl.
CPC ............ *H04N 5/2252* (2013.01); *F16B 2/12* (2013.01); *F16M 13/022* (2013.01); *G03B 17/48* (2013.01); *G03B 17/566* (2013.01); *H04N 7/183* (2013.01); *H04N 5/23206* (2013.01); *H04N 5/23296* (2013.01)

(58) Field of Classification Search
CPC ...... H05K 5/00–069; H05K 7/00–2099; G06F 3/1683; H04N 5/2252; H04N 7/183; H04N 5/23296; H04N 5/23293; G03B 17/561
USPC ..................... 348/211.99, 373–376; 396/428; 361/600–837
See application file for complete search history.

(56) References Cited

U.S. PATENT DOCUMENTS

2002/0002788 A1\* 1/2002 Hope ...................... F41C 27/00
42/106
2006/0087564 A1\* 4/2006 Kawamura ............ H04N 5/232
348/211.99

(Continued)

*Primary Examiner* — Xi Wang
(74) *Attorney, Agent, or Firm* — Bold Ventures Patents; Timothy D. Snowden (57) ABSTRACT

A camera system for mounting to a scope can include a camera portion and a mounting system rotationally coupled to the camera portion. The mounting system can include a first securing portion having a first securing member, where the first securing member is configured to abut against a first portion of an eyepiece of the scope. The mounting system can also include a second securing portion having a second securing member, where the second securing member is configured to abut against a second portion of the eyepiece of the scope. The mounting system can further include an adjustment mechanism that simultaneously moves the first securing portion and the second securing portion in opposing directions relative to each other.

19 Claims, 8 Drawing Sheets

(56) References Cited

U.S. PATENT DOCUMENTS

| | | | |
|---|---|---|---|
| 2006/0187338 A1* | 8/2006 | May | H04N 5/2254 348/375 |
| 2010/0118395 A1* | 5/2010 | Douglas-Hamilton | G02B 27/141 359/385 |
| 2011/0317993 A1* | 12/2011 | Weissler | G02B 21/362 396/428 |
| 2012/0057071 A1* | 3/2012 | Yoneyama | G02B 13/004 348/345 |
| 2012/0127319 A1* | 5/2012 | Rao | H04N 5/23206 348/169 |
| 2013/0251358 A1* | 9/2013 | Kuehl | G02B 21/36 396/428 |
| 2014/0375807 A1* | 12/2014 | Muetzel | H04N 7/18 348/148 |
| 2015/0167707 A1* | 6/2015 | Hyers | F16B 2/10 24/488 |
| 2016/0316128 A1* | 10/2016 | Teich | F41G 3/165 |

* cited by examiner

CAMERA SYSTEMS FOR SCOPES

CROSS-REFERENCE TO RELATED APPLICATIONS

This application claims priority under 35 U.S.C. §119 to U.S. Provisional Patent Application Ser. No. 62/341,197, titled "Universal Quick Adjustable Camera and Mount For a Scope" and filed on May 25, 2016, the entire contents of which are hereby incorporated herein by reference.

TECHNICAL FIELD

Embodiments described herein relate generally to scopes, and more particularly to systems, methods, and devices for mounting a camera to a scope.

BACKGROUND

Spotting scopes (or sometimes more simply referred to as scopes) are used for a variety of applications for seeing at distances greater than what binoculars or the bare human eye can see. For example, most commonly, a spotting scope is used in conjunction with a firearm (e.g., a rifle) to aid a user in finding and focusing on a target, generally at a distance (e.g., a mile, 500 yards, 100 meters) that can be difficult or impossible to see without such a device. Adjustments to the focus of the spotting scope are made manually, and the user must peer into an eyepiece. Other uses for a scope can include, but are not limited to, birdwatching and surveillance.

SUMMARY

In general, in one aspect, the disclosure relates to a camera system for mounting to a scope. The camera system can include a camera portion and a mounting system rotationally coupled to the camera portion. The mounting system can include a first securing portion having a first securing member, where the first securing member is configured to abut against a first portion of an eyepiece of the scope. The mounting system can also include a second securing portion having a second securing member, where the second securing member is configured to abut against a second portion of the eyepiece of the scope. The mounting system can further include an adjustment mechanism that simultaneously moves the first securing portion and the second securing portion in opposing directions relative to each other.

In another aspect, the disclosure can generally relate to a scope assembly that includes a scope having an eyepiece. The scope assembly can also include a camera system coupled to the eyepiece of the scope. The camera system can include a camera portion and a mounting system rotationally coupled to the camera portion. The mounting system can include a first securing portion having a first securing member, where the first securing member abuts against a first portion of the eyepiece of the scope. The mounting system can also include a second securing portion having a second securing member, where the second securing member abuts against a second portion of the eyepiece of the scope. The mounting system can further include an adjustment mechanism that simultaneously moves the first securing portion and the second securing portion in opposing directions relative to each other.

In yet another aspect, the disclosure can generally relate to a mounting system for a scope. The mounting system can include a first securing portion having a first securing member, where the first securing member is configured to abut against a first portion of an eyepiece of the scope. The mounting system can also include a second securing portion having a second securing member, where the second securing member is configured to abut against a second portion of the eyepiece of the scope. The mounting system can further include an adjustment mechanism that simultaneously moves the first securing portion and the second securing portion in opposing directions relative to each other.

These and other aspects, objects, features, and embodiments will be apparent from the following description and the appended claims.

BRIEF DESCRIPTION OF THE DRAWINGS

The drawings illustrate only example embodiments of camera systems for mounting to a scope and are therefore not to be considered limiting of its scope, as camera systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of camera systems that can be mounted to scopes. Camera systems can be mounted to any type of scope, including but not limited to a spotting scope, a microscope, a laparoscope, and a telescope, In short, example embodiments can be used with any device or technology that requires co-centricity for optimal performance. Thus, example embodiments are not limited to use with any particular type of scope.

As described herein, a user can be any person that interacts with a scope. Examples of a user may include, but are not limited to, a consumer, a scientist, a lab technician, a hunter, an astronomer, a security professional, a marksman, a medical doctor or technician, a surgeon, a consultant, a ranch owner, a surveying engineer, and a manufacturer's representative.

The camera systems for scopes (or components thereof) described herein can be made of one or more of a number of suitable materials to allow the camera systems to maintain functionality and durability in light of the one or more conditions under which the camera systems for scopes can be exposed. Examples of such materials can include, but are not limited to, aluminum, stainless steel, fiberglass, glass, plastic, ceramic, and rubber.

Example camera systems for scopes, or portions thereof, described herein can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, rotatably, removeably, slidably, and threadably.

Components and/or features described herein can include elements that are described as coupling, mounting, fastening, securing, or other similar terms. Such terms are merely meant to distinguish various elements and/or features within a component or device and are not meant to limit the capability or function of that particular element and/or feature. For example, a feature described as a "coupling feature" can couple, mount, secure, fasten, abut against, be in communication with, and/or perform other functions aside from merely coupling.

A coupling feature (including a complementary coupling feature) as described herein can allow one or more components and/or portions of an example camera system to become mechanically coupled, directly or indirectly, to another portion of the camera system. A coupling feature can include, but is not limited to, a portion of a hinge, an aperture, a recessed area, a protrusion, a clamp, a slot, a spring clip, a tab, a detent, and mating threads. One portion of an example camera system can be coupled to a component of the camera system by the direct use of one or more coupling features.

In addition, or in the alternative, a portion of an example camera system can be coupled to a component of a camera system using one or more independent devices that interact with one or more coupling features disposed on a component of the camera system. Examples of such devices can include, but are not limited to, a pin, a hinge, a fastening device (e.g., a bolt, a screw, a rivet), a clamp, a C-clip, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of camera systems for scopes, one or more of the components shown may be omitted, repeated, and/or substituted. Accordingly, example embodiments of camera systems for scopes should not be considered limited to the specific arrangements of components shown in any of the figures. For example, features shown in one or more figures or described with respect to one embodiment can be applied to another embodiment associated with a different figure or description. Further, any description of a figure or embodiment made herein stating that one or more components are not included in the figure or embodiment does not mean that such one or more components could not be included in the figure or embodiment, and that for the purposes of the claims set forth herein, such one or more components can be included in one or more claims directed to such figure or embodiment.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

Example embodiments of camera systems for scopes will be described more fully hereinafter with reference to the accompanying drawings, in which example embodiments of camera systems for scopes are shown. Camera systems for scopes may, however, be embodied in many different forms and should not be construed as limited to the example embodiments set forth herein. Rather, these example embodiments are provided so that this disclosure will be thorough and complete, and will fully convey the scope of camera systems to those of ordinary skill in the art. Like, but not necessarily the same, elements (also sometimes called components) in the various figures are denoted by like reference numerals for consistency.

Terms used herein such as, but not limited to, "top", "bottom", "left", "right", "proximal", "distal", "first", and "second" are used merely to distinguish one component (or part of a component or state of a component) from another. Such terms are not meant to denote a preference or a particular orientation, and are not meant to limit embodiments of camera systems for scopes. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
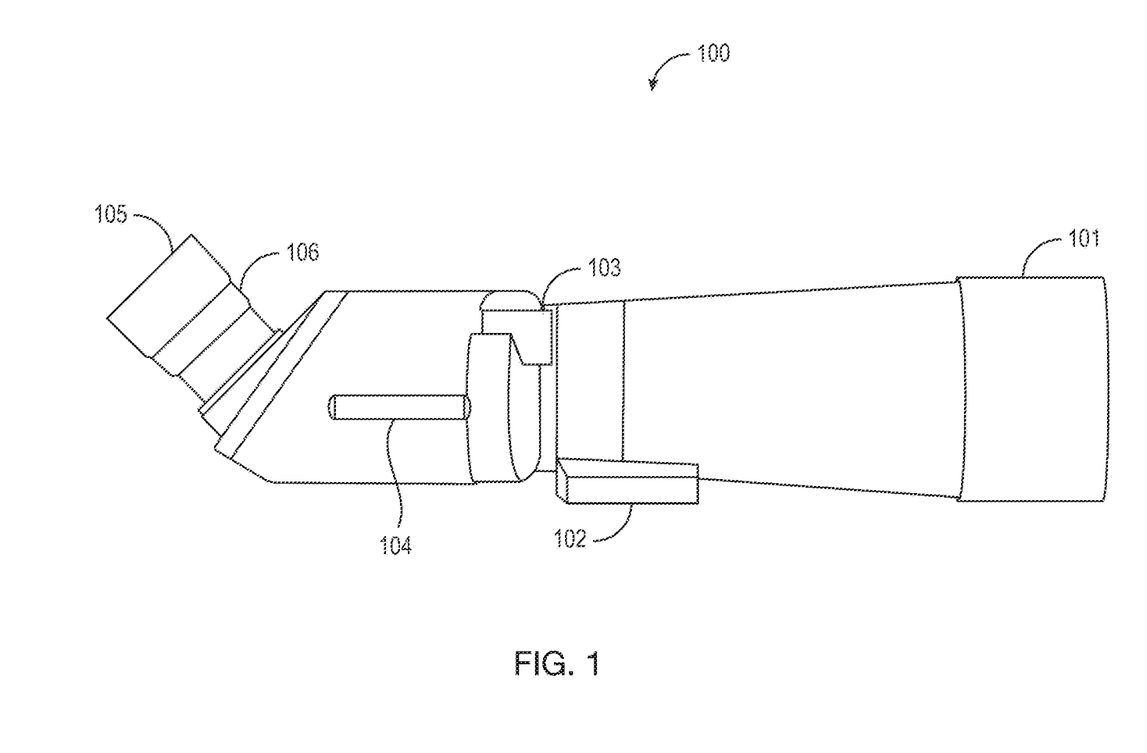
FIG. 1 shows an example spotting scope with which example camera systems can be used.

FIG. 1 shows an example scope 100 with which example camera systems can be used. In this case, the scope 100 is a spotting scope, such as what might be used for hunting, long-range shooting, or surveillance. The scope 100 of FIG. 1 includes a number of elements. Specifically, the scope 100 includes a lens 101, a mounting feature 102, a focus adjustment feature 103, a sighting tube 104, and eyepiece 105, and a zoom adjustment feature 106. The eyepiece 105 and the zoom adjustment feature 106 are adjacent to each other and have a circular cross-sectional shape.

Figure 2A:
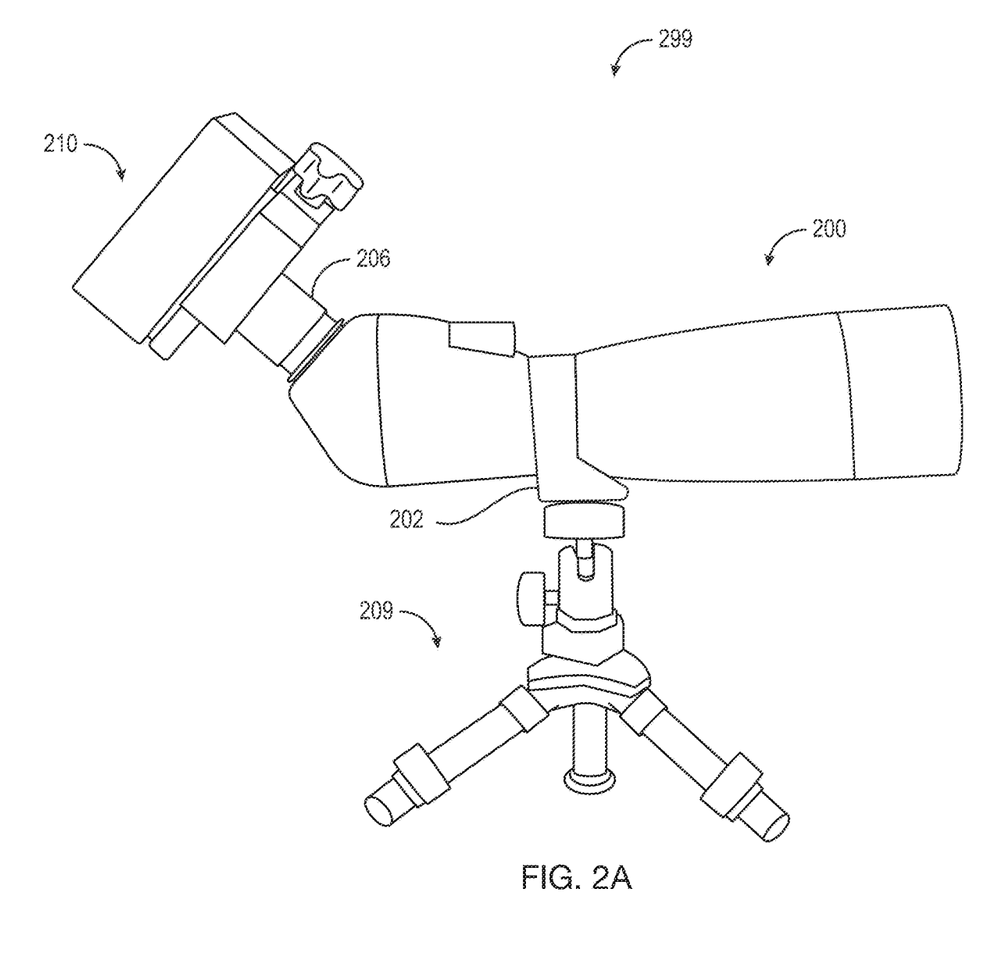
FIGS. 2A and 2B show a spotting scope assembly that includes a camera system in accordance with certain example embodiments.
Figure 2B:
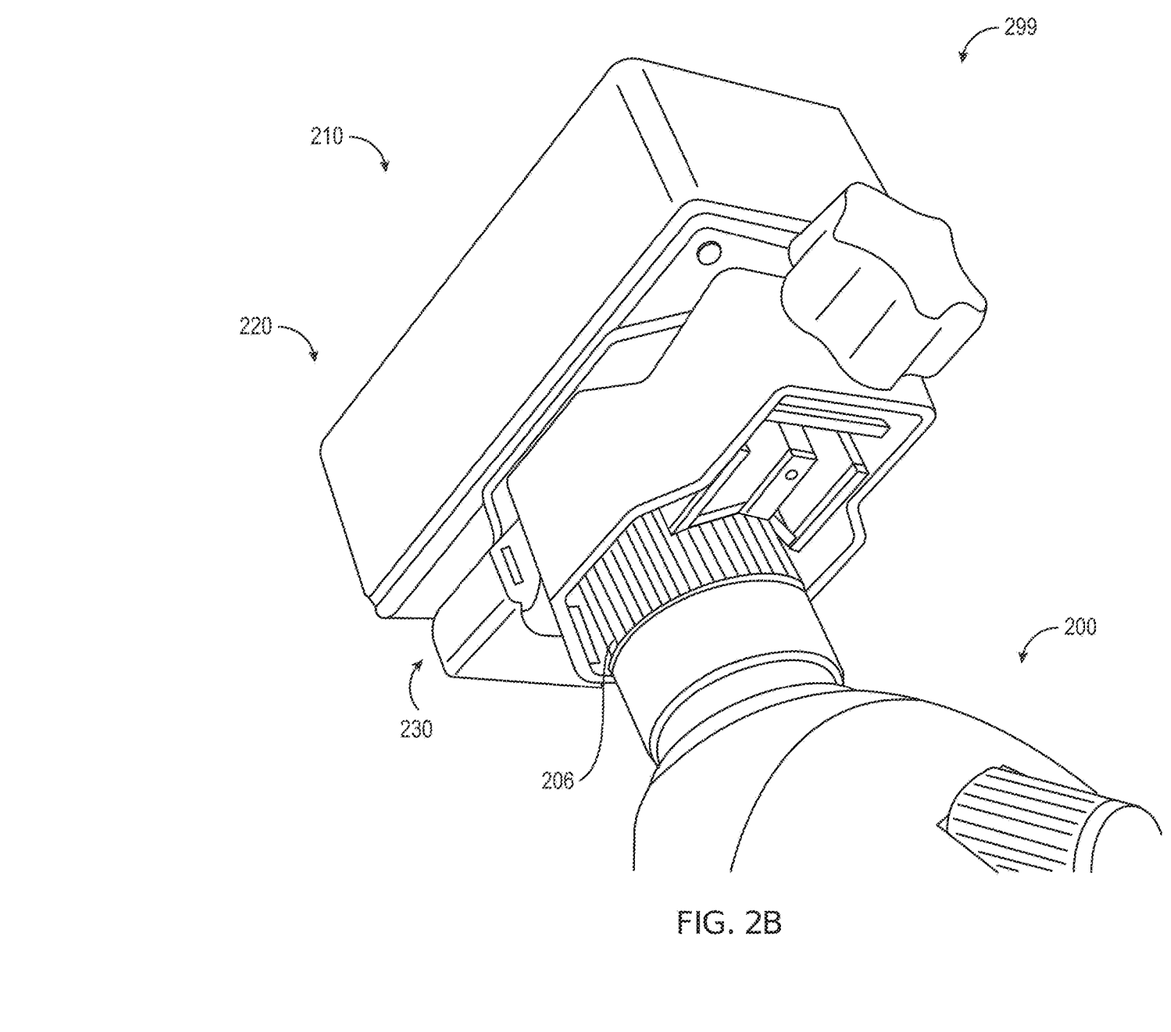

FIGS. 2A and 2B show a spotting scope assembly 299 that includes a camera system 210 in accordance with certain example embodiments. Referring to FIGS. 1-2B, the camera system 210 is mounted over the eyepiece (hidden from view) and part of the zoom adjustment feature 206 of the scope 200. The scope 200 in this case is coupled to a mounting stand 209 using the mounting feature 202 of the scope 200.

The example camera system 210 can include one or more of a number of portions. For example, the camera system 210 of FIGS. 2A and 2B includes a camera portion 220 and a mounting system 230 that are rotationally coupled to each other. The mounting system 230 of the camera system 210 is used to couple the camera system 210 to the scope 200. More details of the mounting system 230 and the camera portion 220 are described below with respect to FIGS. 3A-6B.

Figure 3:
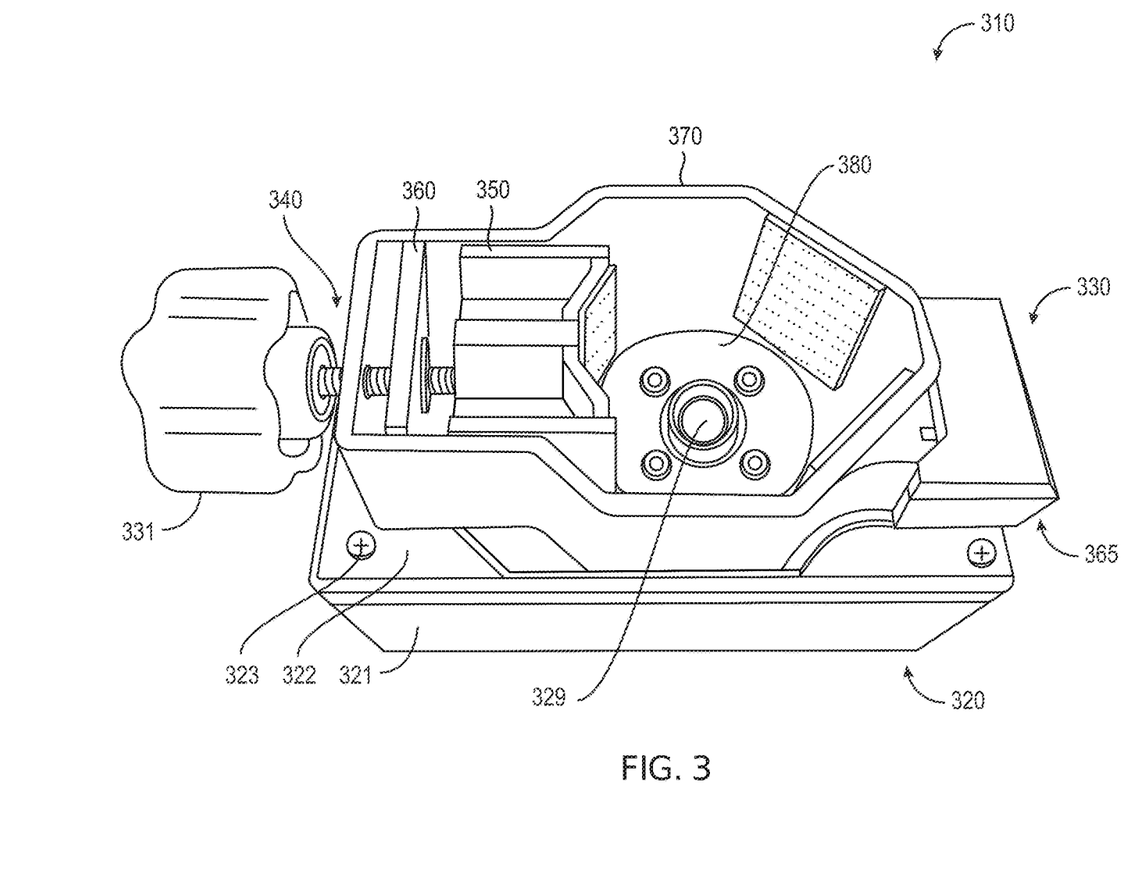
FIG. 3 shows a bottom view of a camera system in accordance with one or more example embodiments.

FIG. 3 shows a bottom view of a camera system 310 in accordance with one or more example embodiments. Referring to FIGS. 1-3, the camera system 310 of FIG. 3 includes a camera portion 320 and a mounting system 330 that are rotationally coupled to each other. The mounting system 330 can include one or more of a number of components. For example, the mounting system 330 of FIG. 3 includes a knob 331 coupled to a jack screw 340 (also referred to herein as an adjustment mechanism 340), a first securing portion 350, a second securing portion 370, a base 360, a distal portion 365, and a rotating platform 380 (also sometimes called a slip ring 380).

As shown in more detail below with respect to FIGS. 4A and 4B, the adjustment mechanism 340, when rotated, causes both the securing portion 350 and the securing portion 370 to move in opposing directions along axis formed by the adjustment mechanism 340. The base 360 remains in a fixed position, and so the securing portion 350 and the securing portion 370 move with respect to the base 360. Further, since the location of the rotating platform 380 is fixed relative to the base 360, since the center of the rotating platform 380 is centered with respect to the securing portion 350 and the securing portion 370, and since the lens 329 of the camera is disposed in the center of the rotating platform 380, the lens 329 of the camera is centered with respect to the securing portion 350 and the securing portion 370.

In this way, when an eyepiece (e.g., eyepiece 105) of a scope (e.g., scope 100) is disposed within the mounting system 330, and when the adjustment mechanism 340 is used to secure the camera system 310 against the scope, the eyepiece will be precisely aligned with the lens 329 of the camera inside the camera portion 320 of the camera system 310. As a result, the camera inside the camera portion 320 of the camera system 310 can offer the same view that would be available if a user placed his or her eye against the eyepiece of the scope.

In this case, using the knob 331, the adjustment mechanism 340 rotates axially along the length of the adjustment mechanism 340 and acts as a kind of turnbuckle. In other words, as an example, if the adjustment mechanism 340 rotates clockwise, the securing portion 350 and the securing portion 370 move toward each other at an equal rate. Conversely, if the adjustment mechanism 340 rotates counter-clockwise, the securing portion 350 and the securing portion 370 move away from each other at an equal rate.

The camera portion 320 includes a housing 321 coupled to a platform 322 using one or more fastening devices 323 (e.g., screws). As discussed below with respect to FIGS. 5A and 5B, the platform 322 of the camera portion 320 is coupled to the rotating platform 380 and the base 360 of the mounting system 330 as to allow the camera portion 320 to rotate with respect to the mounting system 330. More details about the mounting system 330 are described below with respect to FIGS. 4A and 4B.

While the housing 321 of the camera portion 320 is shown in FIG. 3 as being a hyperrectangle (or a box or a n-orthotope), the housing 321 of the camera portion 320 can alternatively have any of a number of other shapes, sizes, and/or features. For example, the top surface of the housing 321 (hidden from view in FIG. 3) can be a plain, featureless surface, much the same as the side surface of the housing 321 shown in FIG. 3. Alternatively, the top surface of the housing 321 can be, or have integrated into a portion thereof, a display showing the view seen by the camera through the lens 329. Similarly, the shape, size, and features of the mounting system 330 can also vary relative to what is shown in FIG. 3.

The housing 321 can be removeable or otherwise configured to allow a user access to contents within the housing 321. In such a case, a user can repair and/or replace one or more components (e.g., battery, hardware processor, memory, camera), or portions thereof, disposed within the housing. In addition, or in the alternative, the entire housing 321, including the components within, can be removed and replaced in a modular design.

Figure 4A:
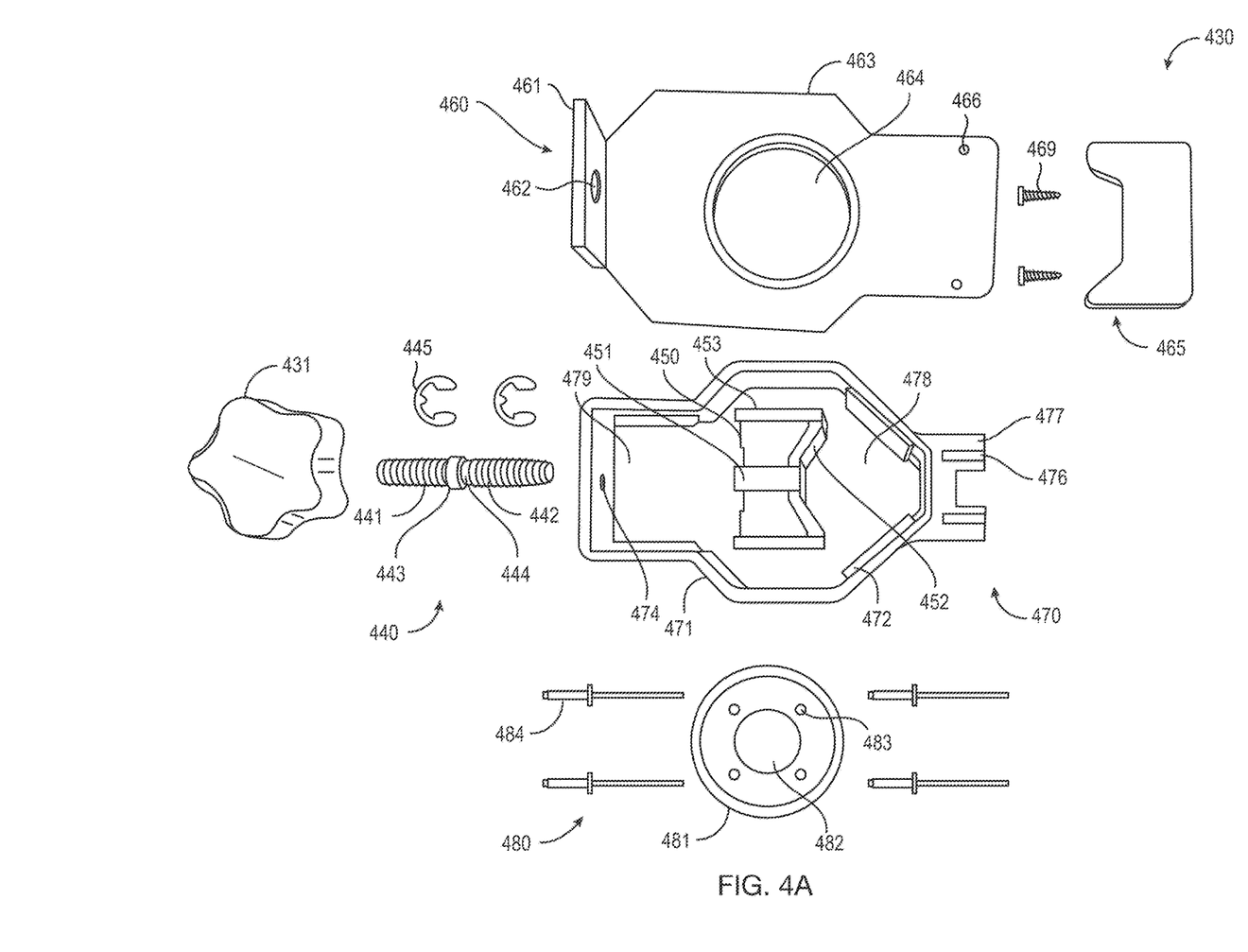
FIGS. 4A and 4B show a various views of a mounting system of the camera system in accordance with one or more example embodiments.
Figure 4B:
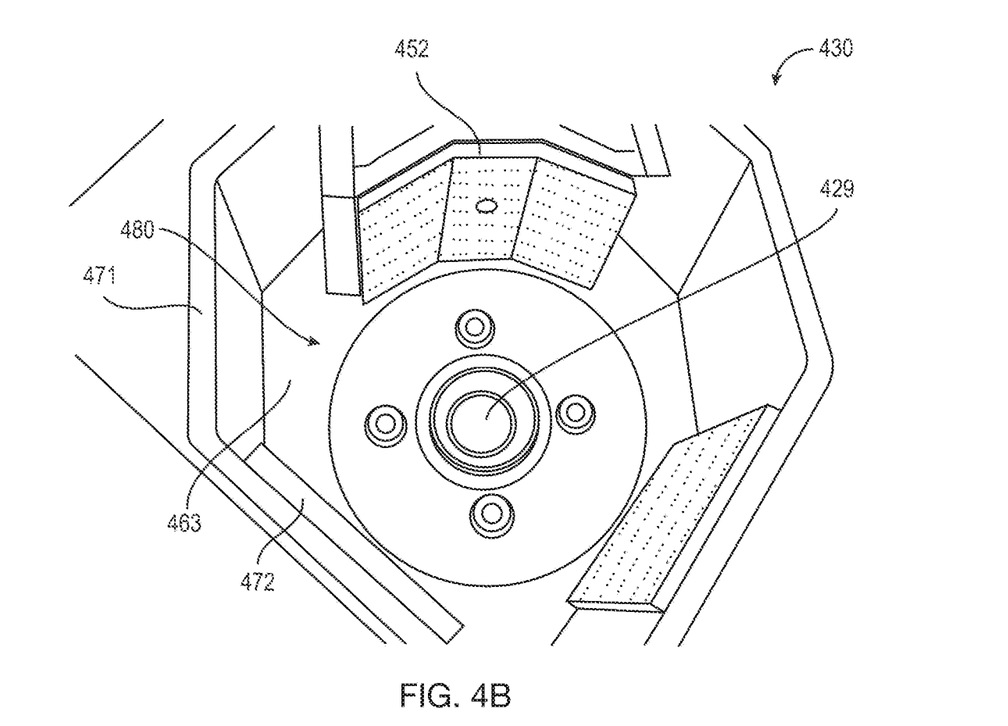

FIGS. 4A and 4B show an exploded view and a detail of an assembled view, respectively, of a mounting system 430 of the camera system in accordance with one or more example embodiments. Referring to FIGS. 1-4B, details of an example the adjustment mechanism 440 can be seen. In this case, the adjustment mechanism 440 has a proximal end with one set of mating threads 441 and a distal end with another set of mating threads 442. In between the mating threads 441 and the mating threads 442 is a neutral portion 443 that is featureless (e.g., no mating threads). On either side of the neutral portion 443 can be one or more coupling features 444 (e.g., slots) into which one or more other coupling features 445 (in this case, C-clips) can be disposed.

As discussed above, the mating threads 441 at the proximal end of the adjustment mechanism 440 run in an opposite direction as the mating threads 442 at the distal end of the adjustment mechanism 440. In this way, as the adjustment mechanism 440 rotates, the adjustment mechanism 440 acts as a turnbuckle relative to securing portion 470 and securing portion 450.

Securing portion 470 has at least one wall 471 that forms at least a central cavity 478. In this case, the wall 471 also forms an auxiliary cavity 479, adjacent to the central cavity 478, into which securing portion 450 can at least partially be disposed. Within the central cavity 478, opposite the auxiliary cavity 479, disposed on the inner surface of one or more of the walls 471 of the securing portion 470 can be disposed one or more gripping elements 472. Each of these gripping elements 472 can be used to abut against and secure a portion of an eyepiece (e.g., eyepiece 105) of a scope (e.g., scope 100). As such, the gripping elements 472 can be made of one or more of a number of materials (e.g., rubber) that have a relatively high friction coefficient and can, in some cases, be flexible to increase surface contact with the eyepiece.

To promote solid contact and maximize the use of the gripping elements 472, the wall 471 on which the gripping elements 472 are disposed (as well as any adjacent walls 471 that do not have gripping elements 472 disposed thereon) can be angled and/or otherwise configured in a particular way. For example, as shown in FIGS. 4A and 4B, the walls 471 can be form a U-shape, where the walls that form the sides of the U have gripping elements 472 disposed thereon, and where the base of the U does not have any gripping elements 472. As another example, the walls 471 can form a V-shape. As yet another example, the walls 471 can form a sawtooth shape. As still another example, the walls 471 can form an arc or a series of arcs.

Regarding of the configuration of the walls 471 having gripping elements 472 disposed thereon (and any adjacent walls 471 without gripping elements 472), the gripping elements 472 are used, in part, to secure the camera system (e.g., camera system 210) against the eyepiece of the scope while also helping to position the eyepiece relative to the lens 429 of the camera.

In certain example embodiments, the securing portion 470 can be movably coupled to the adjustment mechanism 440. For example, as shown in FIG. 4A, a wall 471 that forms the auxiliary cavity 479 can have a coupling feature 474 that allows the securing portion 470 to be movably coupled to the adjustment mechanism 440. In this case, the coupling feature 474 is a threaded aperture that traverse the wall 471. The threads of the coupling feature 474 can be configured to mate with the mating threads 441 at the proximal end of the adjustment mechanism 440.

In certain example embodiments, as the adjustment mechanism 440 rotates in one direction (e.g., clockwise), the securing portion 470 moves toward the knob 431 (toward the proximal end of the adjustment mechanism 440). Conversely, as the adjustment mechanism 440 rotates in the other direction (e.g., counter-clockwise), the securing portion 470 moves in the opposite direction, away from the knob 431 (toward the neutral portion 443 of the adjustment mechanism 440).

The distal end of the securing portion 470 also has one or more extensions 477 that extend away from the wall 471. These extensions can include one or more coupling features 476 (in this case, slots) that moveably couple to one or more complementary coupling features (hidden from view) of the distal portion 465 of the mounting system 430. The one or more coupling features 476 keep the securing portion 470 in linear alignment as the securing portions moves back and forth.

The distal portion 465 is fixedly coupled to the base 460 using one or more coupling features. In this case, the coupling features include coupling features 466 (in this case, apertures that traverse the base 460) of the base 460, one or more complementary coupling features (hidden from view, but also apertures that traverse a portion of the distal portion 465) of the distal portion 465, and coupling features 469 (in this case, screws that are disposed in the coupling features 466 of the base 460 and the complementary coupling features of the distal portion 465).

In certain example embodiments, securing portion 450 has a body 453 and is shaped to be disposed, at least in part, within the auxiliary cavity 479 formed by the walls 471 of the securing portion 470. Disposed on the outer surface at the distal end of securing portion 450 can be one or more gripping elements 452. Each of these gripping elements 452 can be used to abut against and secure a portion of an eyepiece (e.g., eyepiece 105) of a scope (e.g., scope 100). The portion of the eyepiece secured by the gripping elements 452 can be at the opposite side of the eyepiece secured by the gripping elements 472 of the securing portion 470. The gripping elements 452 can be substantially the same as the gripping elements 472 described above with respect to the securing portion 470.

To promote solid contact and maximize the use of the gripping elements 452, the outer surface of the distal end of the body 453 of the securing portion 450 on which the gripping elements 452 are disposed can be angled and/or otherwise configured in a particular way. For example, as shown in FIGS. 4A and 4B, the outer surface of the distal end of the body 453 of the securing portion 450 can be form a U-shape, where the gripping elements 452 are disposed along the length of the U shape. As another example, the outer surface of the distal end of the body 453 of the securing portion 450 can form a V-shape. The shape formed by the outer surface of the distal end of the body 453 of the securing portion 450 can be the same as, or different than, the shape formed by the walls 471 of the securing portion 470.

Regarding of the configuration of the outer surface of the distal end of the body 453 of the securing portion 450 having gripping elements 452 disposed thereon, the gripping elements 452 can be used, in part, to secure the camera system (e.g., camera system 210) against the eyepiece of the scope while also helping to position the eyepiece relative to the lens 429 of the camera.

In certain example embodiments, the securing portion 450 can be movably coupled to the adjustment mechanism 440. For example, as partially shown in FIG. 4A, there can be a coupling feature 451 that traverses at least part of the body 453 of the securing portion from the proximal end. This coupling feature 451 can allow the securing portion 450 to be movably coupled to the adjustment mechanism 440 and move within the auxiliary cavity 479 and/or the central cavity 478 formed by the securing portion 470. In this case, the coupling feature 451 is a threaded aperture that traverses most, but not all, of the body 453 of the securing portion 450. The threads of the coupling feature 451 can be configured to mate with the mating threads 442 at the distal end of the adjustment mechanism 440.

In certain example embodiments, as the adjustment mechanism 440 rotates in one direction (e.g., counter-clockwise), the securing portion 450 moves toward the knob 431 (toward the proximal end of the adjustment mechanism 440). Conversely, as the adjustment mechanism 440 rotates in the other direction (e.g., clockwise), the securing portion 450 moves in the opposite direction, away from the knob 431 (toward the neutral portion 443 of the adjustment mechanism 440). In any case, as the adjustment mechanism 440 rotates, the securing portion 450 moves at the same rate but in the opposite direction compared to the securing portion 470.

In certain example embodiments, the neutral portion 443 of the adjustment mechanism 440 is disposed within a coupling feature 462 (in this case, an aperture) in the extension 461 of the base 460. Since the neutral portion 443 in this case is featureless (e.g., no mating threads), and since the coupling feature 462 is similarly featureless, the adjustment mechanism 440 can freely rotate with respect to the base. When the adjustment mechanism 440 includes a coupling feature 444 located between the neutral portion 443 and the mating threads 441, and another coupling feature 444 located between the neutral portion 443 and the mating threads 442, and when coupling features 445 are coupled to coupling features 444, the adjustment mechanism 440 can be held in place with respect to movement along the length of the adjustment mechanism 440 while still allowing the adjustment mechanism 440 to freely rotate relative to the base 460.

In such a case, one coupling feature 445 can be located adjacent to and/or abut against an outer surface of the extension 461 of the base 460, while the other coupling feature 445 can be located adjacent to and/or abut against an inner surface of the extension 461 of the base 460. This configuration of the mounting system 430 to secure the eyepiece of a scope can ensure that the eyepiece is centered (or otherwise positioned in a desired location) at any point in a plane (e.g., in the plane defined by the base 460).

The base 460 of the mounting system 430 can also include a main portion 463 that has an aperture 464 that traverses therethrough. The aperture 464 can receive the rotating platform 480. The rotating platform 480 is in communication with the aperture 464 in the main portion 463 of the base 460, but the rotating platform 480 is not directly coupled to the base 460. This configuration, described in more detail below with respect to FIGS. 5A and 5B, allows the rotating platform 480 to freely rotate with respect to the base 460. Because the rotating platform 480 is in communication with the base 460, there can be one or more features (e.g., detents, friction contact) that can hold the relative position between the rotating platform 480 and the base 460 without some minimal amount of force. This minimal amount of force required to move the rotating platform 480 relative to the base 460 can be applied without the use of tools by a user.

The rotating platform 480 can include a body 481 having a number of coupling features 483 (in this case, apertures that traverse the body 481) that allow the rotating platform 480 to be fixedly coupled to a platform (e.g., platform 322) of the camera portion (e.g., camera portion 320). In this case, coupling features 484 (e.g., rivets) are disposed within the coupling features 483 as well as corresponding coupling features in the platform of a camera portion.

The body 481 of the rotating platform 480 can also include a aperture 482 that traverses the body 481 of the rotating platform 480, where the aperture 482 is centered on the body 481. The aperture 482 can be large enough to accommodate at least a portion of the lens 429 of the camera disposed in the camera portion of the example camera system. This rotational communication between the camera portion and the mounting system 430 allows a user to quickly and easily make adjustments to ensure that the camera is oriented properly to view the images seen through the scope.

Figure 5A:
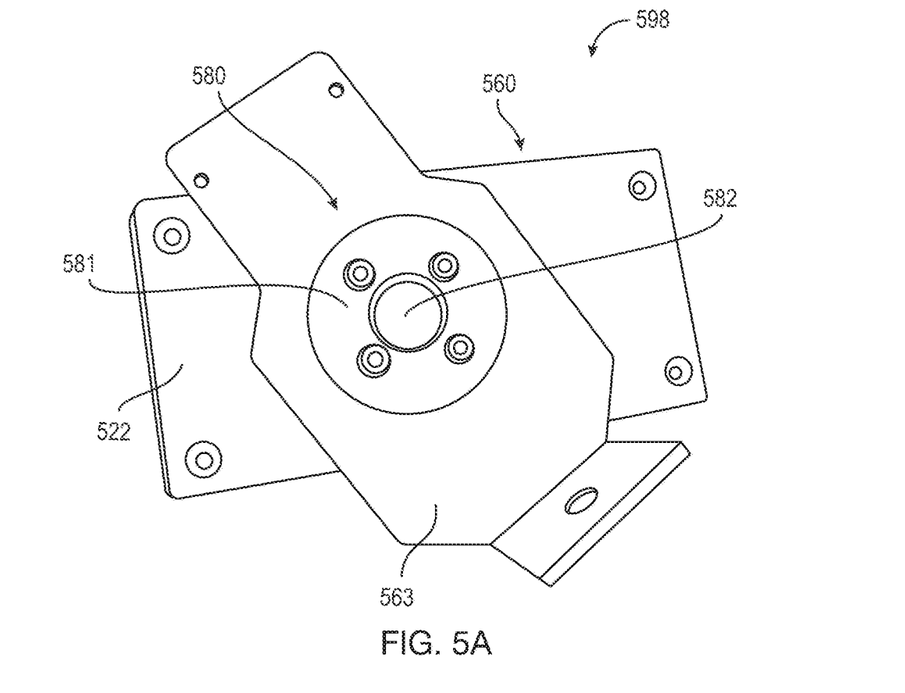
FIGS. 5A and 5B show an interface between the mounting portion and the camera platform of a camera system in accordance with certain example embodiments.
Figure 5B:
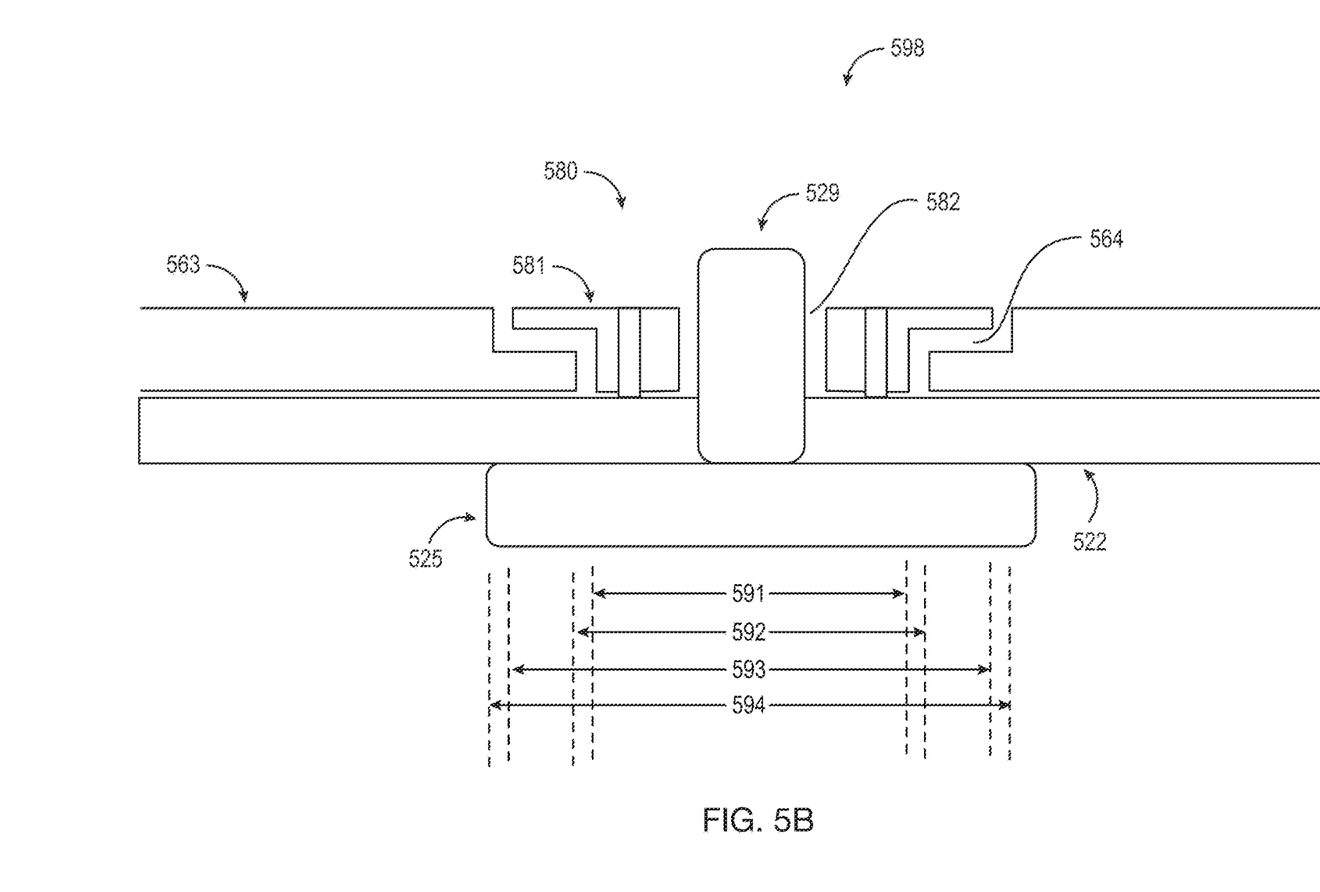

FIGS. 5A and 5B show a top view and a cross-sectional side view, respectively, of a subassembly 598 of a camera system that includes an interface between the mounting portion and the camera platform in accordance with certain example embodiments. Referring to FIGS. 1-5B, the subassembly 598 of FIGS. 5A and 5B includes the base 560 and the rotating platform 580 of a mounting system and the platform 522 of a camera portion, and shows an example of how these three components interact with each other.

As stated above, the rotating platform 580 is fixedly coupled to the platform 522, while the base 560 is in rotatable communication with the rotating platform 580 and the platform 522. The base 560, the rotating platform 580, and the platform 522 can include one or more features that allow for this rotatable communication to occur. An example of such a configuration is shown in FIG. 5B.

Specifically, the aperture 564 that traverses the main portion 563 of the base 560 can have a first diameter 592 at the bottom end of the main portion 563 and a second diameter 594 at a top end of the main portion 563. In addition, the outer surface of the body 581 of the rotating platform 580 can have a diameter 591 at a bottom end of the rotating platform 580 and a diameter 593 at a top end of the rotating platform 580. In this case, diameter 591 is less than the diameter 592, and diameter 593 is less than diameter 594.

Since the bottom end of the rotating platform 580 is adjacent to the end of the base 560, and since the top end of the rotating platform 580 is adjacent to the top end of the base 560, the rotating platform 580 can be in rotatable communication with respect to the base 560. In some cases, one or more of the surfaces that define the aperture 564 that traverses the base 560 and/or the outer surface of the body 581 of the rotating platform 580 can include one or more features (e.g., detents, set screw, clamp, friction) that can help maintain the relative position between the base 560 and the rotating platform 580, at least until some minimal amount of force is applied to the base 560 and/or the rotating platform 580 to change the relative position between the base 560 and the rotating platform 580.

While this example shows two different diameters for the outer surface of the rotating platform 580 and for the aperture 564 of the base 560, there can be three or more different diameters of each in other example embodiments. FIGS. 5A and 5B also show how the lens 529 of the camera 525 can traverse the aperture 582 in the rotating platform 580 as well as the aperture 564 in the base 560. In this case, aperture 582 and aperture 564 form concentric circles when viewed from above.

Figure 6A:
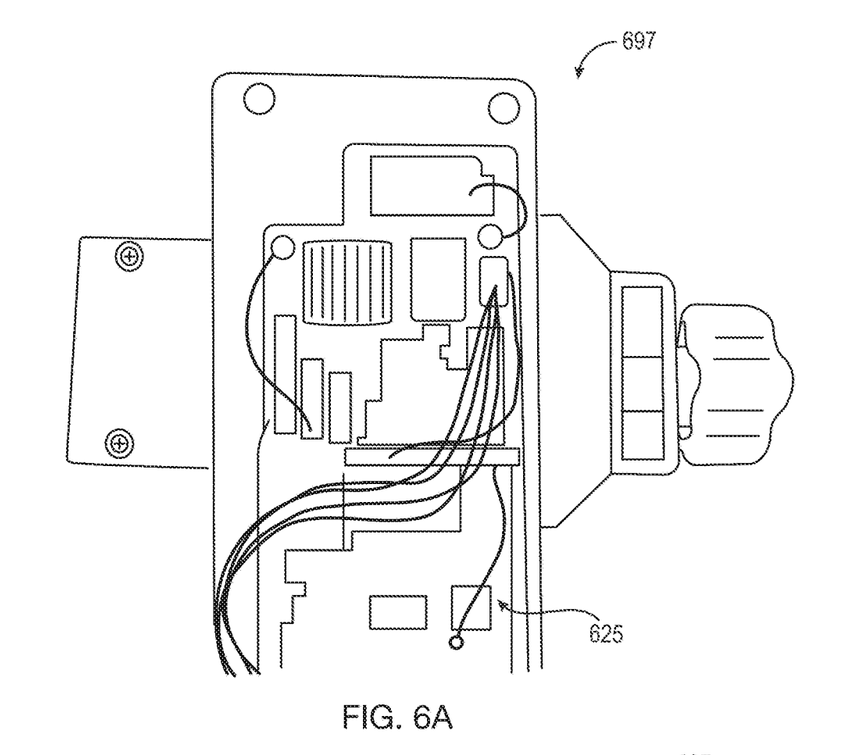
FIGS. 6A and 6B show the camera system without the camera housing in accordance with certain example embodiments.
Figure 6B:
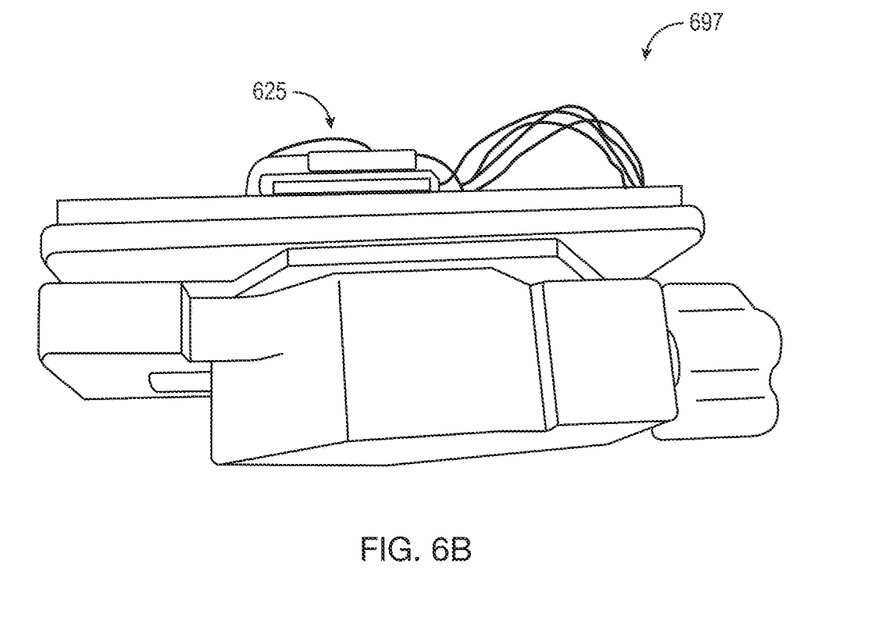

FIGS. 6A and 6B show a subassembly 697 of a camera system without the camera housing in accordance with certain example embodiments. Referring to FIGS. 1-6B, the subassembly 697 of FIGS. 6A and 6B shows the camera 625 disposed within the camera housing. The camera 625 can capture any types of images (e.g., still pictures, streaming video) in any spectrum (e.g., visible light, infrared). The camera 625 can be a traditional stand-alone camera or a camera that is integrated with another device (e.g., a cell phone).

The camera 625 can also include one or more components (e.g., a transceiver, a hardware processor, memory, a storage repository, a timer, a controller, an energy storage device (e.g., battery, supercapacitor)) that allow for communication, control, and/or any of a number of other functions that can relate to operation and use of the camera system to capture images from the scope. For example, a user can wirelessly communicate with the camera 625 and adjust the zoom on the camera 625, which can allow the user to correct for or accentuate the manual zoom of the scope. Any communication between a user and the camera 625 of the example camera system can occur using wireless (e.g., WiFi) and/or wireless technology.

In certain example embodiments, the camera 625 looks though the eyepiece of the scope and sees the same image as the human eye would see if it were looking through the eyepiece of the scope. The camera 625 can then transmits (e.g., continuously, wirelessly) the image or images to a mobile device or other device of a user using a transceiver. Transmission of the images captured by the camera 625 can be sent to a user device automatically or based on some factor (e.g., instructions from a user, lapse of time).

While eyepieces of a scope typically have a circular cross-sectional shape when viewed from above, example embodiments can work with eyepieces of scopes having any of a number of other cross-sectional shapes (e.g., oval, square). Example embodiments can work with scopes having eyepieces of varying shape and size. Example embodiments can also be adjustable in terms of the disposition of the lens (e.g., lens 529) of a camera (e.g., camera 525) to be at a proper distance from the eyepiece of the scope to allow for adequate images to be captured by the camera. For example, the housing of the camera portion of the example camera system can be removable and replaceable, in a modular format. In this way, the camera portion and the mounting system can be manufactured, marketed, and/or sold as separate products rather than as a single camera system. As another example, the distance between the camera portion and the mounting system of an example camera system can be adjustable by a user without compromising the free rotation between the camera portion and the mounting system.

Example embodiments provide a number of benefits. Examples of such benefits include, but are not limited to, use of a scope without the focus required to look through the eyepiece with the human eye, ease of use, ease of adjustment, modular design, remote control and communication, and enhanced zooming and other optical abilities relative to the images captured. Example embodiments can also provide an interactive interface with a user to capture, edit, request, and otherwise receive images as seen through the scope in real time or at various times.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A camera system for mounting to a scope, the camera system comprising:
   a camera portion; and
   a mounting system rotationally coupled to the camera portion, wherein the mounting system comprises:
   a first securing portion comprising a first securing member, wherein the first securing member is configured to abut against a first portion of an eyepiece of the scope;
   a second securing portion comprising a second securing member, wherein the second securing member is configured to abut against a second portion of the eyepiece of the scope;
   an adjustment mechanism that, when operated, simultaneously moves the first securing portion and the second securing portion in opposing directions relative to each other, wherein operating the adjustment mechanism is designed to keep the eyepiece aligned with the camera portion when the adjustment mechanism is engaged with the eyepiece;
   a base on which the first securing portion and the second securing portion are slidably disposed, wherein the base comprises a first aperture that traverses therethrough between the first securing portion and the second securing portion; and
   a rotating platform disposed within the first aperture and rotatably in communication with the base, wherein the rotating platform is fixedly coupled to a camera portion platform of the camera portion.

2. The camera system of claim 1, wherein the first securing member is padded and is configured to make multiple points of contact with the eyepiece of the scope.

3. The camera system of claim 1, wherein the adjustment mechanism comprises a jack screw, wherein the jack screw comprises a neutral portion disposed between first mating threads and second mating threads, wherein the neutral portion is disposed within an aperture in a base of the mounting system, wherein the first mating threads engage first complementary mating threads of the first securing portion, wherein the second mating threads engage second complementary mating threads of the second securing portion, wherein the first mating threads and the second mating threads oppose each other.

4. The camera system of claim 1, wherein the rotating platform comprises a second aperture that traverses the rotating platform, wherein a lens of a camera of the camera portion is disposed within the second aperture.

5. The camera system of claim 4, wherein the first aperture and the second aperture are concentric with each other.

6. The camera system of claim 1, wherein the rotating platform comprises a plurality of second apertures that align with a plurality of third apertures disposed in the camera portion platform, wherein the rotating platform and the camera portion platform are fixedly coupled to each other using a plurality of fastening devices disposed in the plurality of second apertures and the plurality of third apertures.

7. The camera system of claim 1, wherein the first aperture of the base has a first diameter at a first bottom end of the first aperture and a second diameter at a first top end of the first aperture, wherein the rotating platform comprises an outer surface comprising a third diameter at a second bottom end and a fourth diameter at a second top end, wherein the third diameter is less than the first diameter, wherein the fourth diameter is less than the second diameter, wherein the second bottom end of the rotating platform is adjacent to the first bottom end of the base, and wherein the second top end of the rotating platform is adjacent to the first top end of the base.

8. The camera system of claim 1, wherein the mounting assembly further comprises a mounting assembly housing comprising at least one wall that forms a cavity, wherein the first securing portion, the second securing portion, and a distal portion of the adjustment mechanism are disposed within the cavity, wherein a proximal portion of the adjustment mechanism is accessible outside the mounting assembly housing.

9. The camera system of claim 8, wherein the proximal portion of the adjustment mechanism comprises a knob.

10. The camera system of claim 1, wherein the camera portion comprises a camera housing and a camera, wherein the camera housing comprises at least one wall that forms a cavity, and wherein the camera is disposed within the cavity.

11. The camera system of claim 10, wherein the camera comprises a lens, wherein the lens of the camera protrudes through a first aperture in the camera portion and a second aperture in the mounting system, wherein the camera portion and the mounting system rotate with respect to each other around the lens.

12. The camera system of claim 10, wherein the camera portion further comprises a display that shows images captured by the camera.

13. The camera system of claim 10, wherein the camera portion further comprises a transceiver, wherein the transceiver transmits images captured by the camera to a remote device of a user.

14. The camera system of claim 13, wherein the transceiver transmits the images captured by the camera to the remote device of the user using wireless technology.

15. The camera system of claim 10, wherein the camera portion further comprises a controller, wherein the controller adjusts at least one optical parameter of the camera, wherein the at least one optical parameter comprises at least one selected from a group consisting of focus and zoom.

16. The camera system of claim 15, the controller adjusts the zoom of the camera beyond a range of zoom offered by the scope.

17. The camera system of claim 1, wherein the camera portion is rotatable to an upright position while the mounting system is in a fixed position relative to the eyepiece of the scope.

18. A camera system for mounting to a scope, the camera system comprising:
- a camera portion comprising a camera housing and a camera, wherein the camera housing comprises at least one wall that forms a cavity, and wherein the camera is disposed within the cavity; and
- a mounting system rotationally coupled to the camera portion, wherein the mounting system comprises:
  - a first securing portion comprising a first securing member, wherein the first securing member is configured to abut against a first portion of an eyepiece of the scope;
  - a second securing portion comprising a second securing member, wherein the second securing member is configured to abut against a second portion of the eyepiece of the scope; and
  - an adjustment mechanism that, when operated, simultaneously moves the first securing portion and the second securing portion in opposing directions relative to each other, wherein operating the adjustment mechanism is designed to keep the eyepiece aligned with the camera portion when the adjustment mechanism is engaged with the eyepiece,
- wherein the camera comprises a lens, wherein the lens of the camera protrudes through a first aperture in the camera portion and a second aperture in the mounting system, wherein the camera portion and the mounting system rotate with respect to each other around the lens.

19. A camera system for mounting to a scope, the camera system comprising:
- a camera portion; and
- a mounting system rotationally coupled to the camera portion, wherein the mounting system comprises:
  - a first securing portion comprising a first securing member, wherein the first securing member is configured to abut against a first portion of an eyepiece of the scope;
  - a second securing portion comprising a second securing member, wherein the second securing member is configured to abut against a second portion of the eyepiece of the scope; and
  - an adjustment mechanism that, when operated, simultaneously moves the first securing portion and the second securing portion in opposing directions relative to each other, wherein operating the adjustment mechanism is designed to keep the eyepiece aligned with the camera portion when the adjustment mechanism is engaged with the eyepiece,
- wherein the mounting assembly further comprises a mounting assembly housing comprising at least one wall that forms a cavity, wherein the first securing portion, the second securing portion, and a distal portion of the adjustment mechanism are disposed within the cavity, wherein a proximal portion of the adjustment mechanism is accessible outside the mounting assembly housing.

* * * * *